US009945704B2

(12) United States Patent
Galvez

(10) Patent No.: US 9,945,704 B2
(45) Date of Patent: Apr. 17, 2018

(54) FLOW RATE MEASUREMENT IN A VOLUME

(71) Applicant: NuScale Power, LLC, Corvallis, OR (US)

(72) Inventor: Cristhian Galvez, Corvallis, OR (US)

(73) Assignee: NUSCALE POWER, LLC, Corvallis, OR (US)

(*) Notice: Subject to any disclaimer, the term of this patent is extended or adjusted under 35 U.S.C. 154(b) by 343 days.

(21) Appl. No.: 14/791,233

(22) Filed: Jul. 2, 2015

(65) Prior Publication Data

US 2016/0003655 A1 Jan. 7, 2016

Related U.S. Application Data

(60) Provisional application No. 62/021,627, filed on Jul. 7, 2014.

(51) Int. Cl.
G01F 1/66 (2006.01)
G21C 17/032 (2006.01)

(52) U.S. Cl.
CPC ............... G01F 1/66 (2013.01); G01F 1/667 (2013.01); G21C 17/032 (2013.01)

(58) Field of Classification Search
CPC ........................................................ G01F 1/66
See application file for complete search history.

(56) References Cited

U.S. PATENT DOCUMENTS

| 5,078,957 | A | 1/1992 | Tower et al. |
| 5,141,709 | A | 8/1992 | Gaussa, Jr. et al. |
| 5,156,803 | A | 10/1992 | Engding et al. |
| 5,652,396 | A * | 7/1997 | Gill .......................... G01F 1/662 73/861.27 |
| 5,844,956 | A | 12/1998 | Schramm |
| 8,681,920 | B2 | 3/2014 | Heibel et al. |
| 9,324,465 | B2 | 4/2016 | Splichal, Jr. |
| 2004/0129088 | A1 * | 7/2004 | Moscaritolo ............ G01F 1/667 73/861.25 |

(Continued)

FOREIGN PATENT DOCUMENTS

| CN | 87108015 | 6/1988 |
| CN | 1684203 | 10/2005 |
| DE | 43 41 542 | 6/1995 |

(Continued)

OTHER PUBLICATIONS

Listing of Related Cases, Dec. 3, 2015.

Primary Examiner — Robert R Raevis
(74) Attorney, Agent, or Firm — Schwabe Williamson & Wyatt

(57) ABSTRACT

A system for measuring flow rate within a volume includes one or more transmission devices that transmit one or more signals through fluid contained within the volume. The volume may be bounded, at least in part, by an outer structure and by an object at least partially contained within the outer structure. A transmission device located at a first location of the outer structure transmits a first signal to a second location of the outer structure. A second signal is transmitted through the fluid from the second location to a third location of the outer structure. The flow rate of the fluid within the volume may be determined based, at least in part, on the time of flight of both the first signal and the second signal.

20 Claims, 8 Drawing Sheets

(56) References Cited

U.S. PATENT DOCUMENTS

2012/0150413 A1    6/2012  Bunce
2015/0020608 A1*  1/2015  Chevrier .................. G01F 1/667
                                                  73/861.31

FOREIGN PATENT DOCUMENTS

| DE | 297 03 255 | 7/1998 |
|----|------------|--------|
| DE | 102 35 059 | 2/2001 |
| DE | 10 2008 013224 | 9/2009 |
| EP | 538930 | 4/1993 |
| EP | 2366979 | 9/2011 |
| EP | 2 738 372 | 6/2014 |
| FR | 2 947 091 | 12/2010 |
| WO | 92/15097 | 9/1992 |
| WO | 09/087280 | 7/2009 |

* cited by examiner

FLOW RATE MEASUREMENT IN A VOLUME

STATEMENT OF RELATED MATTERS

This application claims priority to U.S. Provisional Patent Application No. 62/021,627 filed on Jul. 7, 2014, the contents of which are herein incorporated by reference.

GOVERNMENT INTEREST

This invention was made with Government support under Contract No. DE-NE0000633 awarded by the Department of Energy. The Government has certain rights in this invention.

BACKGROUND

In a nuclear reactor, a core of nuclear material may be confined to a relatively small volume internal to the reactor so that a reaction may occur. A controlled nuclear reaction may persist for an extended period of time, which may include several years, before refueling of the reactor core is required. Accordingly, when used as a source of heat for converting water into steam, a properly designed nuclear reactor may provide a carbon-free, stable, and highly reliable source of energy.

During operation of a nuclear reactor, it may be useful to monitor the temperatures, pressures, and/or flow rates of the coolant within the reactor to ensure that all aspects of the reactor's internal operation are maintained within acceptable limits. For example, in the event that the flow of coolant is too low, components within the reactor may undergo excessive heating, which may result in the failure of one or more reactor components. In the event that the flow of coolant is too high, the reactor core may experience an undue level of cooling, which may result in undesirable fluctuations of reactor output power levels.

Temperatures and potentially corrosive characteristics of primary coolant located near the reactor core may cause sensors, gauges, and/or other types of measurement devices to fail over a period of time. Additionally, shutting down the reactor to replace and/or repair the failed measurement devices may result in significant operational costs and ultimately a less efficient and less reliable source of energy.

Coolant located within a volume, such as a reactor vessel, may experience temperature, pressure, and/or flow rate differentials according to the position and/or operational mode of the reactor at which the measurement is being made. For example, coolant flowing in a relatively straight direction may have a different flow rate as compared to coolant flowing around a corner or around an obstacle within the volume. Similarly, coolant flow during a reactor start-up may experience turbulence and/or surges due to uneven temperature distributions throughout the coolant.

This application addresses these and other problems.

SUMMARY

A method of measuring the flow rate of a fluid located in a volume is disclosed herein. The method may comprise computing a first change in flow rate from a quiescent propagation time of a first acoustic signal transmitted through a first portion of a volume, and computing a second change in the flow rate from a quiescent propagation time of a second acoustic signal transmitted through a second portion of the volume. The flow rate of the fluid through the volume may be measured and/or estimated by, at least in part, aggregating the first change in flow rate and the second change in flow rate. In some examples, the flow rate may be measured within an annular volume located outside of a riser of a reactor vessel.

A system for measuring the flow rate of a fluid located in a volume is disclosed herein. The system may comprise at least one emitter positioned at a first elevation on a surface of a vessel containing the volume, and at least one receiver positioned at a second elevation on the surface of the vessel. Additionally, the system may comprise a signal processor coupled to the at least one emitter and the at least one receiver. The signal processor may be configured to compute and/or estimate the flow rate of the fluid through the volume. In some examples, the system may be configured to measure the flow rate of a coolant located within a reactor vessel of a nuclear reactor module. The flow rate of the coolant may be the result of natural circulation within a reactor vessel that is achieved without any pumps.

A method for measuring flow rate within a volume is disclosed herein. The method may comprise transmitting, by a transmission device, a first signal through fluid contained within the volume. The volume may be bounded, at least in part, by an interior surface of an outer structure and an object at least partially located within the outer structure. The transmission device may be located at a first location on the outer structure. In some example, the transmission device may be located on an exterior surface of the outer structure. A first time of flight of the first signal may be measured from the first location to a second location on the outer structure. Additionally, the method may comprise propagating a second signal through the fluid from the second location to a third location on the outer structure, and measuring a second time of flight of the second signal. The flow rate of the fluid within the volume may be determined based, at least in part, on both the first time of flight and the second time of flight.

A system for measuring flow rate within a volume is disclosed herein. The system may comprise a first transmission device configured to transmit a first signal through fluid contained within the volume. The volume may be bounded, at least in part, by an interior surface of an outer structure and by an object at least partially contained within the outer structure. The first transmission device may be located at a first location on an exterior surface of the outer structure so as to transmit the first signal while avoiding the object. A processing device may be configured to measure a first time of flight of the first signal from the first location to a second location on the exterior surface of the outer structure. Additionally, a second transmission device located at the second location may be configured to transmit a second signal through the fluid from the second location to a third location on the exterior surface of the outer structure while avoiding the object. The processing device may further be configured to measure a second time of flight for the second signal. The flow rate of the fluid within the volume may be determined based, at least in part, on both the first time of flight and the second time of flight.

DETAILED DESCRIPTION

Methods, apparatuses, and systems for measuring, calculating, estimating, or otherwise determining a flow rate through a fluid-filled volume, such as an annular volume, are described herein.

As described in greater detail herein, one or more example systems may comprise various nuclear reactor technologies. Thus, some example systems may comprise and/or be used in conjunction with nuclear reactors that employ uranium oxides, uranium hydrides, uranium nitrides, uranium carbides, mixed oxides, and/or other types of fuel. It should be noted that the examples described herein may comprise and/or also be used with a variety of different types of reactor designs, reactor cooling mechanisms, and/or cooling systems.

Various examples disclosed and/or referred to herein may be operated consistent with, or in conjunction with, one or more features found in U.S. Pat. No. 8,687,759, entitled Internal Dry Containment Vessel for a Nuclear Reactor, U.S. Pat. No. 8,588,360, entitled Evacuated Containment Vessel for a Nuclear Reactor, U.S. application Ser. No. 14/712,507, entitled Transportable Monitoring System, and/or U.S. Provisional Application No. 62/021,627, entitled Flow Rate Measurement in a Volume, the contents of which are incorporated by reference herein.

Figure 1:
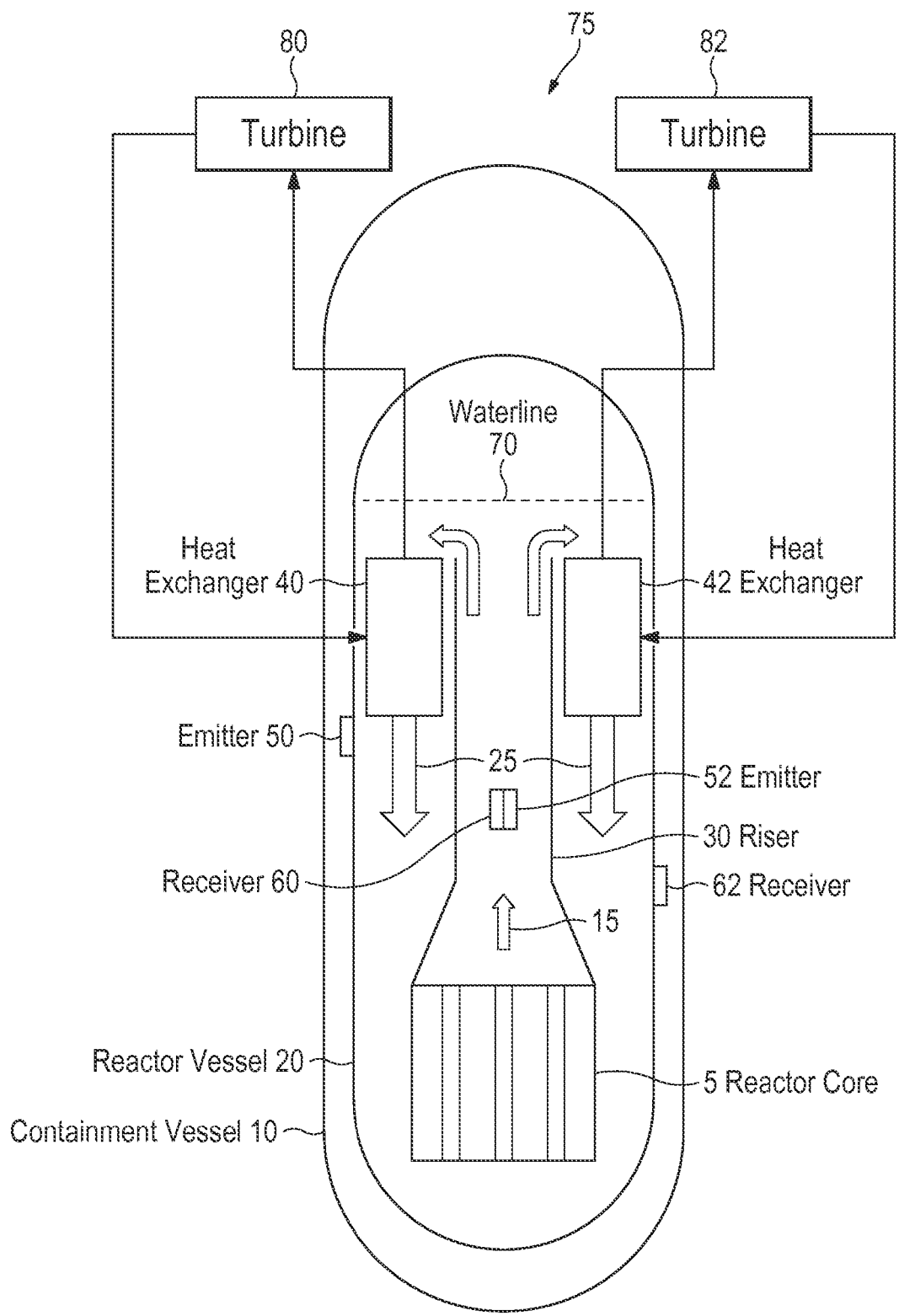
FIG. 1 illustrates a diagram of an example nuclear reactor module employing a system for measuring flow rate.

FIG. 1 illustrates a diagram of an example nuclear reactor module 75 employing a system for measuring flow rate. A reactor core 5 is positioned at a bottom portion of a cylinder-shaped or capsule-shaped reactor vessel 20. Reactor core 5 may comprise a quantity of fissile material that generates a controlled reaction that may occur over a period of perhaps several years. In some examples, one or more control rods may be employed to control the rate of fission within reactor core 5. The control rods may comprise silver, indium, cadmium, boron, cobalt, hafnium, dysprosium, gadolinium, samarium, erbium, europium, other types of materials, and any combination thereof, including alloys and compounds.

In some examples and/or modes of operation of the reactor module 75, a cylinder-shaped or capsule-shaped containment vessel 10 that surrounds reactor vessel 20 may be partially or completely submerged within a pool of water or other fluid. The volume between reactor vessel 20 and containment vessel 10 may be partially or completely evacuated to reduce heat transfer from reactor vessel 20 to the external environment. However, in other examples and/or modes of operation of the reactor module 75, the volume between reactor vessel 20 and containment vessel 10 may be at least partially filled with a gas and/or a fluid that increases heat transfer between the reactor and the containment vessels.

Reactor core 5 is illustrated as being partially or completely submerged within a coolant or fluid, such as water, which may include boron or other additives. The coolant, rises after making contact with a surface of the reactor core. The upward motion of heated coolant is represented by arrow 15 above reactor core 5. The coolant travels upward through riser 30 and over the top of heat exchangers 40 and 42 and is pulled downward by way of convection along the inner walls of reactor vessel 20, thus allowing the coolant to impart heat to heat exchangers 40. After reaching a bottom portion of the reactor vessel, contact with reactor core 5 results in heating the coolant as symbolized by arrow 15.

Although heat exchangers 40 and 42 are illustrated as comprising distinct elements in FIG. 1, heat exchangers 40 and 42 may represent a number of helical coils that wrap around an upper portion of riser 30. Additionally, other helical coils may wrap around an upper portion of riser 30 in an opposite direction, in which, for example, a first helical coil wraps helically in a counterclockwise direction, while a second helical coil wraps helically in a clockwise direction. Further, although a water line 70 is shown as being positioned some distance above heat exchangers 40 and 42, in other examples, reactor vessel 20 may include a lesser or a greater amount of water, fluid, and/or other type of coolant than illustrated by water line 70.

During normal operation of the nuclear reactor module 75, heated coolant rises through a channel defined by riser 30 and makes contact with heat exchangers 40 and 42. After contacting heat exchangers 40 and 42, the coolant sinks towards the bottom of reactor vessel 20 in a manner that induces a thermal siphoning process as shown by arrows 25. In some examples, coolant within reactor vessel 20 remains at a pressure above atmospheric pressure, thus allowing the coolant to maintain a high temperature without vaporizing (i.e. boiling). As coolant within heat exchangers 40 and 42 increases in temperature, the coolant may begin to boil. As boiling commences, vaporized coolant may be routed from a top portion of heat exchangers 40 and 42 to drive one or more of turbines 80 and 82. Turbines 80 and 82 may be configured to convert the thermal potential energy of steam into electrical energy. After condensing, coolant is returned to a bottom portion of heat exchangers 40 and 42.

An emitter 50 may be positioned at an external surface of reactor vessel 20 at a first elevation, such as relative to a bottom portion of reactor vessel 20. Additionally, a receiver 60 may also be positioned on an external surface of reactor vessel 20 at an elevation that is below the elevation of emitter 50. As will be explained in greater detail with reference to subsequent figures, due to the component of the acoustic signal propagating in the same direction as coolant from heat exchangers 40 and 42, the acoustic signal from emitter 50 to receiver 60 may be accelerated as the signal propagates through the portion of the fluid-filled annular volume. In a similar manner, a second acoustic signal from emitter 52 may be accelerated as the second signal propagates from emitter 52 towards receiver 62.

Figure 1A:
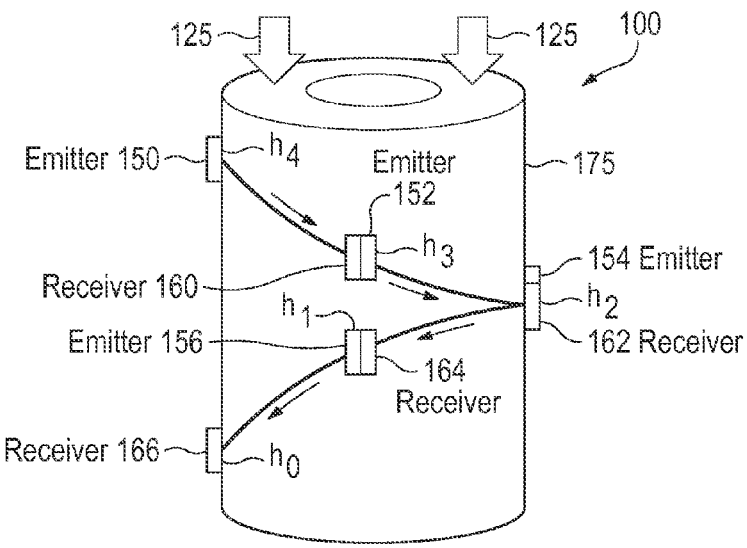
FIG. 1A illustrates an example system for measuring flow rate through a volume.

FIG. 1A illustrates an example system 100 for measuring flow rate through a volume 175. A coolant flows downward through volume 175 as indicated by arrows 125. In some examples, volume 175 may comprise an annular volume. A first emitter 150, located at an elevation $h_4$, may be configured to transmit, retransmit, convey, and/or propagate a first signal at least partially in the direction of the coolant flow through a first portion of volume 175. The first signal may be received at a first receiver 160 at an elevation $h_3$.

A second emitter 152, located at an elevation $h_3$, may be configured to transmit, retransmit, convey, and/or propagate a second signal at least partially in the direction of the coolant flow through a second portion of volume 175. Second emitter 152 may be located adjacent to, next to, and/or co-located with, first receiver 160. In some examples, the second signal may be transmitted, retransmitted, and/or propagated by second emitter 152 in response to first receiver 160 having received the first signal. The second signal may be received by a second receiver 162 at an elevation $h_2$.

A third emitter 154, located at elevation $h_2$, may be configured to transmit, retransmit, convey and/or propagate a third signal from emitter 154, located adjacent or next to second receiver 162, at least partially in the direction of the coolant flow through a third portion of volume 175. Third emitter 154 may be located adjacent to, next to, and/or co-located with, second receiver 162. In some examples, the third signal may be transmitted, retransmitted, and/or propagated by third emitter 154 in response to second receiver 162 having received the second signal. The third signal may be received by a third receiver 164 located at the reverse (back) side of volume 175 at an elevation $h_1$.

A fourth emitter 156, located at elevation $h_1$, may be configured to transmit, retransmit, convey, and/or propagate a fourth signal at least partially in the direction of the coolant flow through a fourth portion of volume 175. Fourth emitter 156 may be located adjacent to, next to, and/or co-located with, third receiver 164. In some examples, the fourth signal may be transmitted, retransmitted, and/or propagated by fourth emitter 156 in response to third receiver 164 having received the third signal. The fourth signal may be received by a fourth receiver 166 at an elevation $h_0$.

The coolant indicated by arrows 125 may comprise a fluid, such as water, a gas, such as air, or a mixture of fluid and gas, such as steam. Additionally, the coolant may comprise one or more types of fluids, gases, two-phase mixtures, other types of mediums, or any combination thereof.

Figure 2:
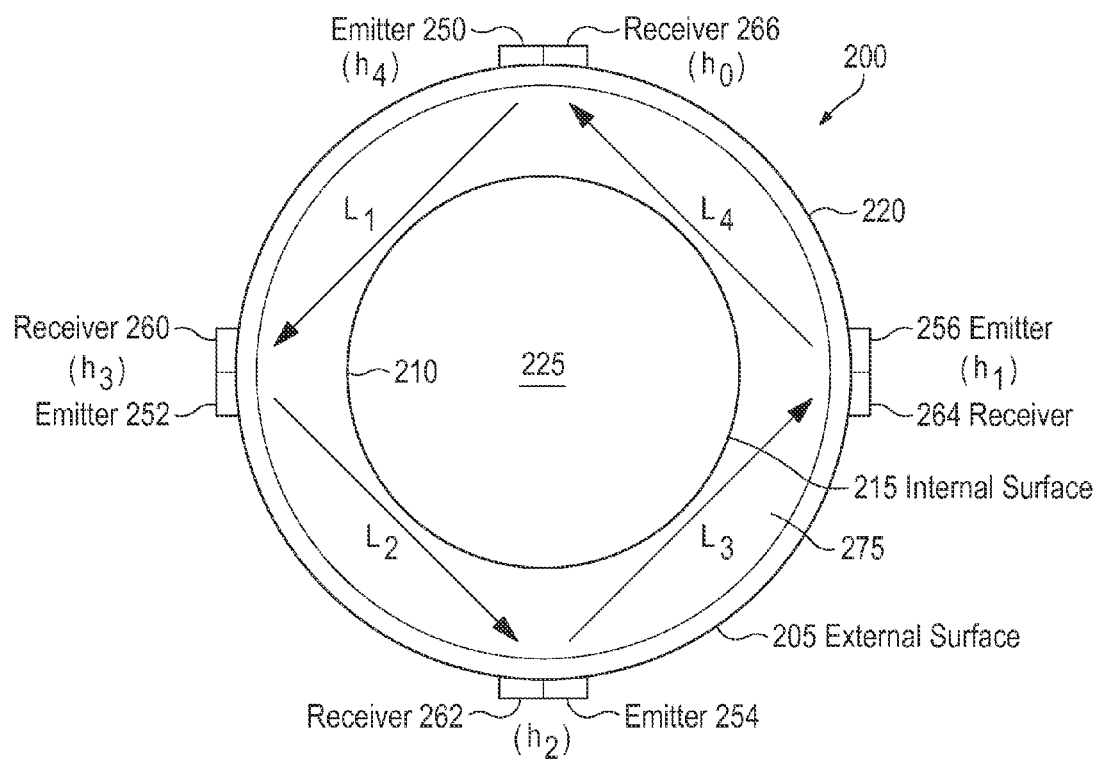
FIG. 2 illustrates a top view of an example system for measuring flow rate through a volume.

FIG. 2 illustrates a top view of an example system 200 for measuring flow rate through an annular volume 275. An internal surface 215 may represent an inner volume 225 having, for example, two-thirds the radius of the annular volume 275 bounded by external surface 205. An emitter 250 is located at an elevation $h_4$ and may be in line with receiver 266 located an elevation $h_0$. Receiver 260 may be approximately collocated with emitter 252, emitter 254 may be approximately collocated with receiver 262 at elevation $h_2$, and emitter 256 may be approximately collocated with receiver 264 at elevation $h_1$.

Distances $L_1$, $L_2$, $L_3$, and $L_4$ represent line-of-sight paths and/or signal paths between an emitter and a corresponding receiver located at a different, such as lower, elevation than the emitter. In examples in which internal surface 215 may comprise an inner volume 225 having a larger radius in comparison to the radius of the annular volume 275 bounded by external surface 205, additional emitter and receiver pairs may be used to provide a line-of-sight path between each emitter and receiver. In some examples, an emitter and a corresponding receiver are located at different elevations.

The plurality of emitters 250, 252, 254, 256 may be externally located to a surface of a reactor vessel 220 of a nuclear reactor module. Each emitter of the group may be positioned at a unique elevation along a flow path of fluid coolant that exits a heat exchanger and travels downward between an inward facing portion of the reactor vessel 220 and an outward facing portion of a riser 210 located internal to the reactor vessel 220.

In some examples, one or more of the plurality of emitters 250, 252, 254, 256 may be configured to transmit, retransmit, convey and/or propagate an acoustic signal. The plurality of emitters 250, 252, 254, 256 may be mounted to and/or located on the external surface 205 of reactor vessel 220 without requiring any physical penetrations through external surface 205. Additionally, by locating the emitters and/or receivers on the external surface 205, they do not impede the flow of coolant within the reactor vessel 220.

The acoustic signal may comprise an ultrasonic signal having a frequency of between 20.0 kHz and 2.5 MHz, a sonic signal having a frequency of between 20 Hz and 20.0 kHz, an infrasound signal having a frequency of less than 20.0 kHz, other frequency ranges, or any combination thereof. In other examples, one or more of the plurality of emitters 250, 252, 254, 256 may be configured to transmit, retransmit, convey and/or propagate vibratory signals, light signals, ultraviolet signals, microwave signals, x-ray signals, electrical signals, infrared signals, other types of signals, or any combination thereof. Additionally, one or more of the signals may be transmitted, retransmitted, conveyed and/or propagated through an intervening rigid medium, such as an external surface of the reactor vessel 220, and through at least a portion of a fluid located within the annular volume 275 located internal to the reactor vessel 220.

By positioning two, three, four, or another number of emitters at different elevations along the external surface of a reactor vessel 220, a longer effective signal path may be created. The effective signal path may comprise a plurality of signal paths as between one or more pairs of emitters and receivers. For example, the effective signal path may comprise signal paths associated with distances $L_1$, $L_2$, $L_3$, and $L_4$. Similarly, the length of the effective signal path may comprise a summation of the distances $L_1$, $L_2$, $L_3$, and $L_4$.

In some examples, a receiver, such as fourth receiver 266, may be configured to receive a response signal in response an emitter, such as first emitter 250, having transmitted an initial signal into the fluid located within annular volume 275. The initial signal may be transmitted by first emitter 250 to first receiver 260. In response to first receiver having received the initial signal, second transmitter 252 may be configured to transmit, retransmit, convey and/or propagate an intermediate signal to second receiver 262.

The receipt of the initial signal may act as a trigger to transmit the intermediate signal. Similarly, additional intermediate signals may be transmitted, retransmitted, conveyed and/or propagated between other pairs of emitters and receivers located around the reactor vessel 205 until the response signal is received by fourth receiver 266. In some examples, the pairs of emitters and receiver may be configured as signal repeaters, in which a signal is repeated, reflected, and/or bounced along the perimeter of reactor vessel 220, forming a signal loop of up to 360 degrees or more. The effective signal path may be initiated at a first rotational angle, and may conclude at a second rotational angle. In some examples, the second rotational angle approximately equals the first rotational angle, such that the effective signal path may completely surround internal surface 215.

If annular volume 275 is bounded by an inner surface having approximately one-half the radius of an outer surface, three pairs of emitters and receivers may be sufficient to provide a continuous line-of-sight path through the entire annular volume 275. In other examples, in which annular volume 275 is bounded by an inner surface of greater than one-half the radius of an outer surface, a larger number of emitter and receiver pairs may be employed, such as four or more pairs, to provide a line-of-sight path through the annular volume 275.

Figure 3:
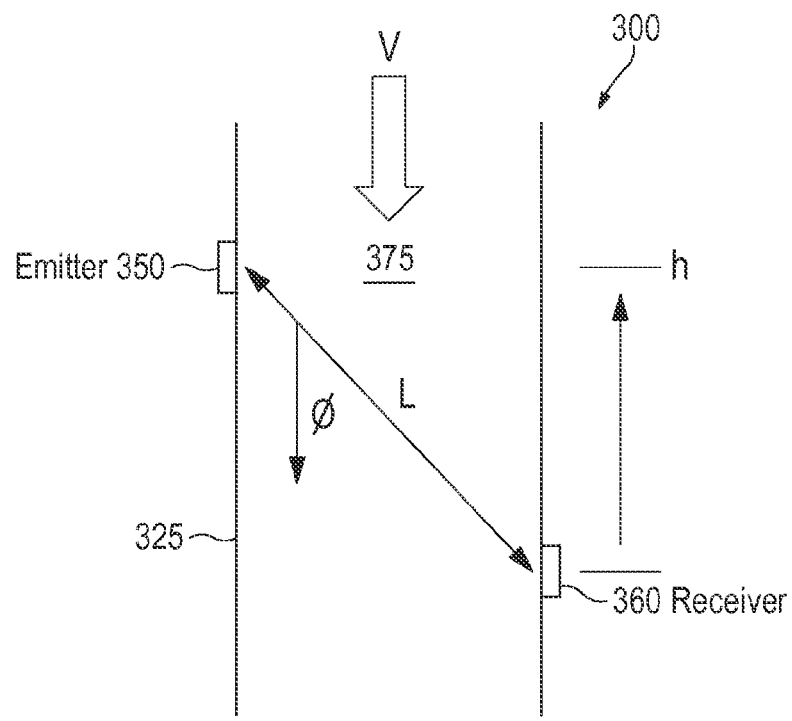
FIG. 3 illustrates an example system comprising an emitter and receiver pair configured to measure flow rate through a volume.

FIG. 3 illustrates an example system 300 comprising an emitter and receiver pair configured to measure flow rate through a volume 375. A signal transmitted at $t_0$ from emitter 350 may be conveyed through an intervening rigid medium 325 that encloses the volume 375, such as, for example, stainless steel. The signal may be conveyed at least partially in the direction of flow and received by receiver 360 at a time tai, as given by the following equation:

$$t_{d1} = L/(c + v^* \cos \theta) \qquad (1)$$

In the right side expression shown in equation (1), "c" represents the speed of the signal in the fluid volume, "v" represents coolant velocity, "L" represents the distance between emitter 350 and receiver 360, and $\theta$ represents an angle between "L" and elevation indicator (h) of emitter 350. Thus, as the velocity of the coolant flow through the volume increases, the propagation time of the signal conveyed in the direction of the flow decreases. Further, as the velocity of flow decreases to zero, the time at which the signal is received at receiver 360 reduces to:

$$t_{d2} = L/c \qquad (2)$$

in which equation (2) may be referred to as a quiescent propagation time of a signal propagating between emitter 350 and receiver 360.

Equation (1) may also be used to determine a change from a quiescent propagation time that results, at least in part, from the velocity of a fluid flowing through the volume. In some examples, the change, such as the time delay, from a quiescent propagation time to a propagation in which the fluid may be flowing at a velocity "v" may be determined by:

$$t_{d1} - t_{d2} = L/(c + v^* \cos \theta) - L/c \qquad (3)$$

Additionally, timing measurements resulting from a signal propagating in a first direction, such as from emitter 350 to receiver 360, may be complemented by timing measurements resulting from the signal propagating in a direction opposite the first direction, such as from receiver 360 to emitter 350. Such time delay measurement may be performed using the equation (3) below in which +v is replaced with −v $$t_{d1} - t_{d2} = L/(c - v^* \cos \theta) - L/c \qquad (3a)$$

As can be seen from equation (3a), as the velocity of the coolant flow through the volume is opposite the direction of propagation of the signal, the propagation time of the signal increases from a quiescent propagation time.

Figure 4:
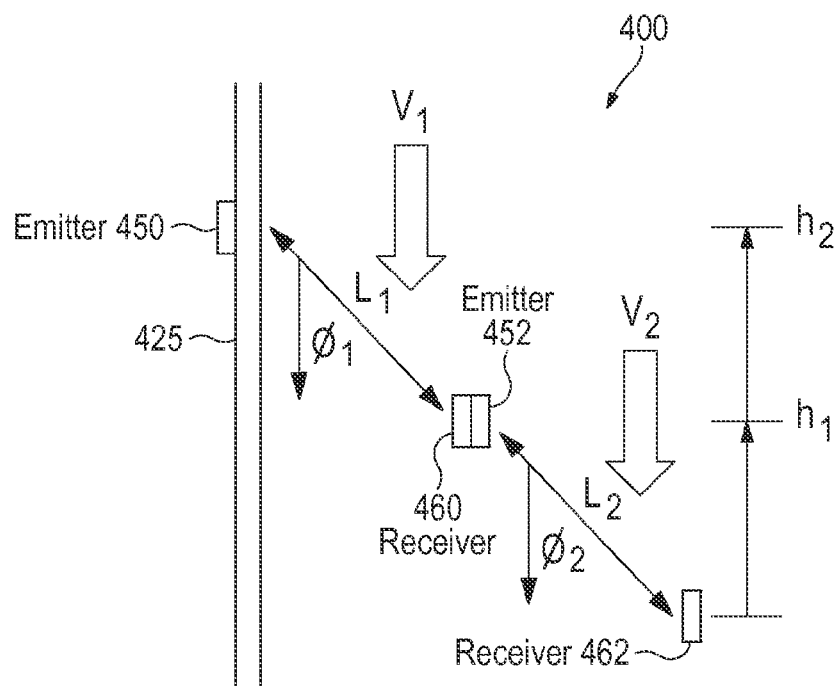
FIG. 4 illustrates an example system for measuring flow rate comprising multiple pairs of emitters and receivers.

FIG. 4 illustrates an example system 400 for measuring flow rate comprising multiple pairs of emitters and receivers. A first signal may be introduced by a first emitter 450 through an intervening rigid medium and into a fluid-carrying volume wherein the fluid travels at a velocity "$V_1$" may be signal may be received by a first receiver 460 located a distance "$L_1$" from first emitter 450. At a time that may be approximately equal to the time that the signal is received at receiver 460, a second emitter 452 may be configured to introduce a second signal through a second portion of the fluid-carrying volume wherein the fluid travels at a velocity "$V_2$" to a second receiver 462 located at a distance "$L_2$" from second emitter 452. In some examples, one or more emitter/receiver pairs, such as emitter 350 and receiver 360 (FIG. 3), first emitter 450 and first receiver 460, and second emitter 452 and second receiver 462, may be configured to couple acoustic energy to and from the fluid carried within the volume through an intervening rigid medium 425, such as stainless steel.

In some examples, changes (i.e. time delays) from quiescent propagation times of signals conveyed through the first and second portions of the volume may be aggregated, at least in part, by way of receivers 460 and 462. The aggregation may be determined by:

$$\text{Time Delay(aggregated)} = L_1/(c + v_1^* \cos \theta_1) - L_1/c + L_2/(c + v_2^* \cos \theta_2) - L_2/c \qquad (4),$$

wherein, as mentioned previously, $L_1$ represents a distance between first emitter 450 and first receiver 460, and $L_2$ represents a distance between second emitter 452 and second receiver 462; "c" represents the speed of the signal through a quiescent volume of fluid; $V_1$ and $V_2$ represent fluid velocities through the first and second portions of the volume, respectively; and $\theta_1$ and $\theta_2$ represent the angles that $L_1$ and $L_2$ make with elevation indicators $h_1$ and $h_2$. In some examples, "c" may represent the speed of an acoustic wave through the volume.

First emitter 450 may make use of a signal having different characteristics than second emitter 452. This may, for example, result in less interference between signals transmitted from first emitter 450 and, for example, signals transmitted from second emitter 452. Thus, in one example, first emitter 450 may be configured to emit a signal having a first frequency, such as 20 kHz, to be received by first receiver 460. Second emitter 452 may be configured to emit a signal having a second frequency, such as 22 kHz, to be received by second receiver 462. In other examples, emitters 450 and 452 may employ non-interfering digital codes using a similar acoustic frequency band.

In still other examples, emitters 450 and 452 may make use of non-identical pulse widths or other techniques to reduce crosstalk between emitters and unintended receivers. By identifying signals with different characteristics, a receiver may be able to distinguish between two signals that it receives from two different emitters. In some examples, the receiver may be configured to ignore a signal that it has inadvertently received from an emitter associated with a different emitter and receiver pair.

One or more of emitters 450, 452 and/or receivers 460, 462 may be configured to measure, calculate, estimate, or otherwise determine a temperature associated with a fluid volume. For example, a first temperature may be determined for a fluid volume associated with first fluid velocity $V_1$, and a second temperature may be determined for a fluid volume associated with second fluid velocity second $V_2$. The temperature may affect the speed at which the signal propagates through the fluid volume. A time delay associated with a signal received by first receiver 460 and/or second receiver 462 may be calibrated or otherwise adjusted to compensate for the temperature of the corresponding fluid volume. In some examples, a difference in temperature from a nominal operating temperature may be determined to adjust the time delay. The temperature of the fluid may be measured directly in some examples, or via the external surface of the container 425, e.g., as a result of conduction of heat through the container wall.

In some examples, a temperature and/or difference in temperature between one or more fluid volumes may be inferred based, at least in part, on the time delays measured by system 400. A first time delay may be associated with a first temperature of a fluid volume, and a second time delay may be associated with a second temperature of a fluid volume. The differences in time delays and/or differences in temperatures of the fluid volumes may be used to determine if there is a relatively cold slug of fluid that is passing through the container 425. Similarly, the differences in time delays and/or differences in temperatures of the fluid volumes may be used to determine if there is an air bubble or a steam bubble that is being propagated through the container 425.

Additionally, the time delay may be used to determine if the fluid comprises a homogenous mixture of two or more mediums. For example, the level of concentration of a secondary medium within a primary medium may affect the time delay of a signal propagated through the primary medium. System 400 may be configured to determine when the secondary medium has been fully incorporated into or mixed with the primary medium. In still other examples, the time delay associated with a received signal may be used to determine if a level of turbidity and/or turbulence of the fluid within container 425.

The flow rates within different regions of the container 425 may be mapped out based on the temperatures and/or time delays. In some examples, system 400 may be configured to monitor the different regions and determine when there is a uniform flow of coolant throughout the entire container. Similarly, system 400 may be configured to determine when there is a uniform temperature distribution of fluid within the container 425. Additionally, system 400 may be configured to determine when there is a uniform mixture and/or concentration of two or more fluids within the container 425. The uniform flow, temperature, mixture, and/or concentration of the fluid may be determined based, as least in part, on a comparison of the time delay(s) of the signals propagated through the fluid.

In a nuclear reactor module, such as illustrated in FIG. 1, a reactor start-up system may be configured to initiate a reactor core start-up based, at least in part, on information provided by system 400. For example, the reactor start-up system may be configured to remove one or more control rods after system 400 determines that there is a uniform flow and/or uniform temperature of coolant circulating through the reactor core.

Figure 5:
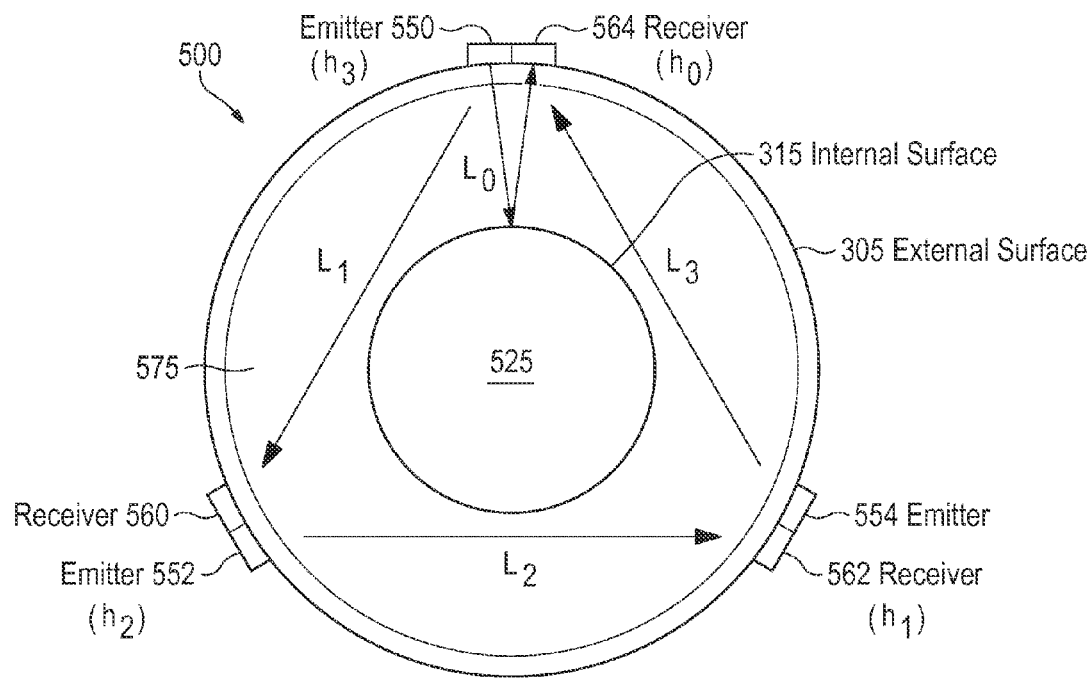
FIG. 5 illustrates a top view of a further example system for measuring flow rate through a volume.

FIG. 5 illustrates a top view of a further example system 500 for measuring flow rate through an annular volume 575. An emitter 550, located at an elevation $h_3$, may be configured to emit a signal for reception by receiver 560, located a distance $L_1$ from emitter 550 and at an elevation $h_2$. Emitter 552, which may be approximately co-located with receiver 560, may be configured to emit a signal for reception by receiver 562 located a distance $L_2$ from emitter 552 at an elevation $h_1$. Emitter 554, which may be approximately co-located with receiver 562, may be configured to emit a signal for reception by receiver 564 located a distance $L_3$ from emitter 554 at an elevation $h_0$. The effective length of the signal path may be increased by aggregating or combining one or more signals associated with distances $L_1$, $L_2$, and $L_3$.

Internal surface 315 may represent an inner volume 525 having, for example, approximately one-half the radius of the annular volume 575 bounded by external surface 305. Inner volume 525 may comprise a cylindrically shaped object approximately centrally located within the annular volume 575. In some examples, internal surface 315 may represent an inner volume 525 having a smaller radius in comparison to the radius of the annular volume 575 bounded by external surface 305. Accordingly, a relatively smaller number of emitter and receiver pairs may be used as compared to an inner volume having a larger radius. The number of pairs of emitter and receivers may be selected so that a line of sight path exists between each emitter and receiver.

In one example, in which an internal surface represents an inner volume having radius of perhaps one-fifth or one-sixth the radius of the annular volume 575 bounded by an external surface, an emitter may convey a first signal to an receiver located almost completely to the opposite side of annular volume 575, such as receiver 162 of FIG. 1A. An emitter, perhaps co-located approximately with receiver 162, may then convey a second signal to a receiver located almost completely to the opposite side of emitter 154 such as, for example, a location proximate with receiver 166.

In some examples, one or more of the emitters, such as emitter 550, may be configured to transmit, re-transmit, convey, and/or propagate a signal along a reflective path $L_0$. For example, a signal transmitted from transmitter 550 may be configured to reflect against the internal surface 315 and be received by receiver 564. The reflective path $L_0$ is therefore approximately equal to, or slightly greater than, twice the distance between internal surface 315 and external surface 305. The length of reflective path $L_0$ between internal surface 315 and external surface 305 may vary according to the change in elevation, or longitudinal distance, between transmitted 50 and receiver 564 along the length of external surface 305. In some examples, reflective path $L_0$ may be less than distances $L_1$, $L_2$, and $L_3$, either individually or collectively.

The diameter, location, and/or curvature of internal surface 315 may change as a result of thermal stress induced by the heated coolant within volume 575. Similarly, the diameter, location, and/or curvature of external surface 305 may change as a result of thermal stress. Accordingly, the receiver 564 may be located and/or sized to accommodate the changes in surface conditions of one or both of internal surface 315 and external surface 305. By locating the plurality of emitters and receivers along external surface 305 and transmitting the one or more signals along the paths associated with distances $L_1$, $L_2$, and $L_3$, the effects of thermal expansion and/or retraction may be further minimized.

Figure 6:
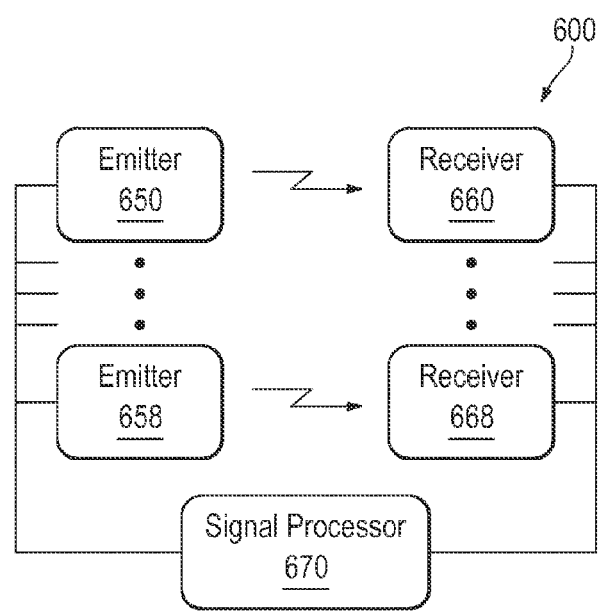
FIG. 6 illustrates a block diagram of an example system for measuring flow rate through a volume.

FIG. 6 illustrates a block diagram of an example system 600 for measuring flow rate through a volume. A first emitter 650 may be coupled to an external surface of the volume and may convey a first signal through an intervening rigid medium and through a first fluid-filled portion of the volume to a first receiver 660. System 600 may comprise other emitters, such as emitter 658, which may also be coupled to an external surface of the volume and may convey one or more additional signals through an intervening rigid medium into a fluid filled portion of the volume to one or more additional receivers, such as receiver 668. A number of additional emitter and receiver pairs may be used to convey acoustic signals through additional portions of the volume to a corresponding receiver.

A signal processor 670 may include a memory and a logic unit, such as a microprocessor, programmable logic circuit, or other logic unit, for aggregating signals from receivers, such as receiver 660 and 668. In an example, such aggregation may include arithmetically summing timing signals from each receiver by way of an operation that accords with expression (4). Signal processor 670 may then compute an estimated flow rate through the entire volume based on such aggregation. In still other examples, signal processor 670 may be configured to calculate an average of the timing signals, in order to determine an average flow rate through the volume. The average flow rate may be used to factor in and/or offset variations in flow in different regions of the volume.

The average of the timing signals may be determined from an aggregated sum of a plurality of timing signals associated with multiple emitter and receiver pairs. In some examples, the plurality of timing signals which are averaged may be sequentially transmitted, and in other embodiments, the plurality of timing signals may be transmitted substantially at the same time or concurrently.

An emitter and receiver pair may be positioned so as to maximize the distance that the signal travels through the volume. Maximizing the distance that the signal and/or signals are propagated may provide for a more accurate reading of the flow rate of the entire volume. The distance between an emitter and its associated receiver may be limited by line-of-sight, such that the distance that the signal travels may only comprise a small portion of the volume in which the flow is being measured.

By adding multiple pairs of emitters and receivers, and similarly by aggregating information associated with their respective signals, a longer effective signal path length may be obtained. In some examples, the effective signal path length may circumnavigate an obstacle located within the volume. For example, with reference to FIG. 3, an effective path of the multiple pairs of emitters and receivers may comprise the combined distances $L_1$, $L_2$, and $L_3$, such that the effective signal path surrounds the internal surface within the surrounding volume.

The plurality of signals may be sequentially transmitted along the effective signal path. A second signal may be transmitted after a first signal, a third signal may be transmitted after the second signal, etc. In some examples, the signals may be sequentially transmitted in response to receiving the prior signal, as a type of chain-reaction. In still other examples, the signal may be reflected and/or re-transmitted by each pair of emitters and receivers to the next pair of emitters and receivers. The multiple pairs of emitters and receivers may form an effective signal path comprising a plurality of signal paths that commence at an initial transmitter and conclude at a terminal receiver.

Signal processor 670 may aggregate signals from receivers, such as receivers 660 and 668, using weighting factors so that timing signals from a first portion of a volume, such as an annular volume, are given more importance than timing signals from a second portion of the volume. In some examples, signals may be weighted according to a relative position of the associated emitter and/or receiver. For example, signals propagated through coolant flowing in a relatively straight direction may have a first weighting factor, and signals propagated through coolant flowing around a corner or around an obstacle within the volume may be associated with a second weighting factor. Similarly, signals propagated through coolant flow during a reactor start-up, during power surges, and/or when uneven temperature distributions are detected throughout the coolant, may also be weighted to account for variations in flow in different regions of the volume.

Signal processor 670 may be configured to compute a change, such as a time delay, of the acoustic signal from a quiescent value. Based, at least in part, on the change, the flow rate of fluid through the portion of the volume may be computed. Additionally, signal processor 670 may be configured to aggregate changes in time delays of acoustic signals conveyed through other portions of the annular volume to estimate the flow rate of fluid through the total volume, such as the total annular volume.

Figure 7:
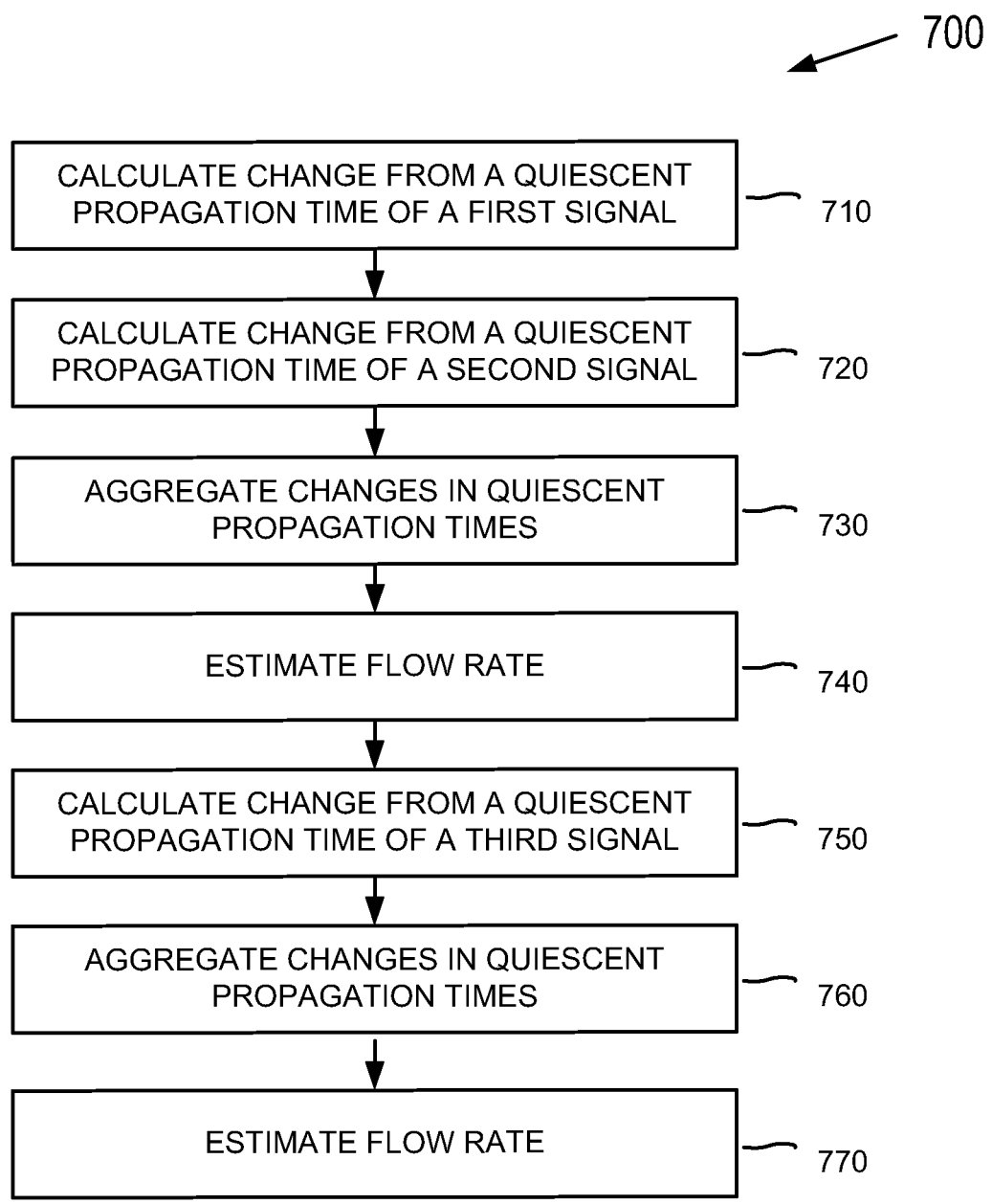
FIG. 7 illustrates an example process of measuring flow rate in a volume.

FIG. 7 illustrates an example process 700 of measuring flow rate in a volume. At operation 710, a first change from a quiescent propagation time of a first acoustic signal transmitted through a first portion of an annular volume may be calculated. In some examples, said computing may comprise coupling a portion of a first acoustic signal from a first portion of the annular volume through an intervening rigid material to an acoustic receiver.

At operation 720 a second change from a quiescent propagation time of a second acoustic signal transmitted through a second portion of the annular volume may be calculated. The first and second changes may be transmitted by a plurality of emitters, located at a corresponding first plurality of locations external to an annular volume. Additionally, a plurality of receivers may be configured to receive time-delayed acoustic signals from the fluid at a second plurality of locations. In some examples, the acoustic signals may be transmitted at a frequency of between 3.0 kHz and 2.5 MHz A sufficient number of emitters may be configured and/or arranged to provide a line of sight between each emitter and at least one receiver. In some examples, each of the plurality of receivers may be approximately collocated with an emitter. Each of the plurality of emitters may be positioned at a unique elevation on an intervening rigid medium that encloses the annular volume.

A first emitter positioned at a first elevation may be configured to emit an acoustic signal in a first direction. In some examples, a second emitter, positioned proximate with a receiver, may be configured to emit an acoustic signal in a second direction approximately opposite the first direction. A signal processor may be configured to compute a time delay of the acoustic signals in both the first direction and the second direction to estimate the flow rate.

In still other examples, three or more emitters may be located at three or more locations around the annular volume. An inner radius of the annular volume may be approximately one half an outer radius of the annular volume. Additionally, each of the three locations may be positioned at a unique elevation on an intervening rigid medium that encloses the annular volume. At operation 730, the first change and the second change may be aggregated. A processor may be configured to estimate, measure, and/or otherwise determine the flow rate through the annular volume at least in part by aggregating representations of the time-delayed acoustic signals. In some examples, the flow rate may be estimated by adding a correction factor to the aggregation of the first change and the second change.

At operation 740, a flow rate of a fluid through the annular volume may be estimated by, at least in part, aggregating the first change and the second change. In some examples, said estimating may comprise adding a correction factor to the aggregation of the first change and the second change.

At operation 750, a third change from a quiescent propagation time of a third acoustic signal transmitted through a third portion of the annular volume may be calculated. In some examples, the first acoustic signal may be transmitted in a first direction through a first portion of the annular volume, and the third acoustic signal may be transmitted in direction opposite to the first direction through the first portion of the annular volume. Additionally, the second acoustic signal may be transmitted in a second direction through a second portion of the annular volume, and the third acoustic signal may be transmitted in a direction opposite to the second direction through the second portion of the annular volume.

At operation 760, the first change, the second change, and the third change may be aggregated.

At operation 770, a flow rate of a fluid through the annular volume may be estimated, at least in part, by aggregating the third change with the first and the second change.

One or more signals may be transmitted at varying intervals according to a particular system operating condition. For example, during normal system operation, signals may be transmitted at regular intervals, e.g., once per second, to monitor the status of the flow rate. At other operations, such as during a reactor startup, the intervals may be shortened to a number of milliseconds to provide more immediate response time to any change or variation in flow rate and/or temperature of the fluid.

Figure 8:
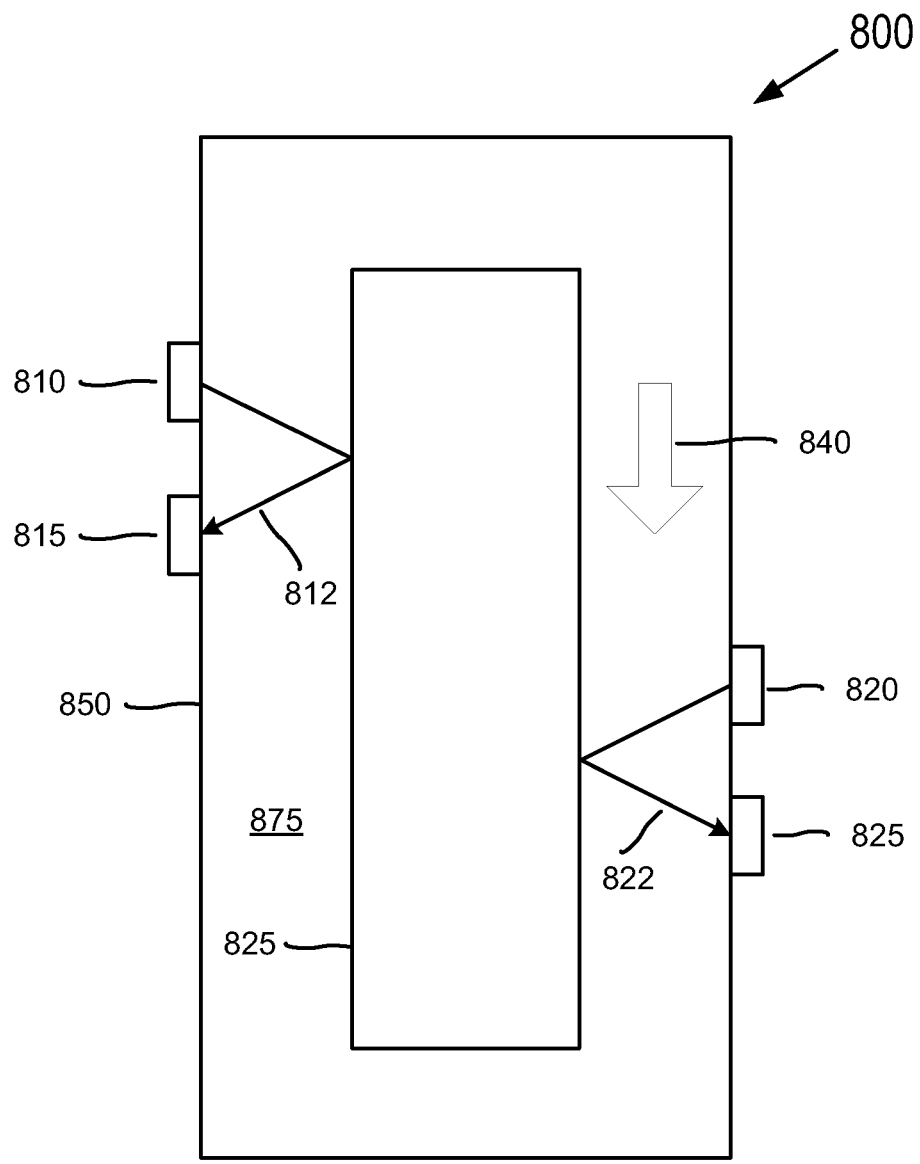
FIG. 8 illustrates a side view of another example system for measuring flow rate through a volume.

FIG. 8 illustrates a side view of another example system 800 for measuring flow rate through a volume 875. Volume 875 may be located between a containment vessel 850 and an internal object 825 located at least partially within containment vessel 850. In some examples, internal object 825 may be approximately centrally located within containment vessel 850. Additionally, internal object 825 may be substantially surrounded by liquid 840 within volume 875.

Fluid 840 may be configured to flow between containment vessel 850 and internal object 825 in a general longitudinal direction. In some examples, system 800 may be configured such that fluid 840 flows from a first end of containment vessel 850 to a second end of containment vessel 850, such as through a pipe or conduit. In other examples, system 800 may be configured such that fluid circulates in a first direction outside of internal object 825, and in a second direction inside of internal object 825, e.g., through an internal passageway of internal object 825.

One or more sets of signal transponders and/or processing devices may be configured to measure, calculate, estimate, or otherwise determine a flow rate of fluid 840 through volume 875. For example, a first set of signal transponders comprising a first transmitter 810 and a first emitter 815 may be configured to transmit and receive, respectively, a signal along a first reflective signal path 812. Similarly, a second set of signal transponders comprising a second transmitter 820 and a second emitter 825 may be configured to transmit and received, respectively, a signal along a second reflective signal path 822. First reflective signal path 812 and second reflective signal path 822 may reflect off different portions of object 825. In some examples, the distance of first reflective signal path 812 may be approximately equal to the distance of second reflective signal path 822

A signal propagation time associated with first reflective signal path 812 may be used to evaluate a flow rate of fluid 840 within a first portion of volume 875. Additionally, a signal propagation time associated with second reflective signal path 822 may be used to evaluate a flow rate of fluid 840 within a second portion of volume 875. The first and second portions may correspond to different elevations or longitudinal positions within containment vessel 850. In other examples, the first and second portions may correspond to different circumferential positions within volume 875 around internal object 825.

Signal propagation times for a plurality of signals transmitted by two or more transmitters and reflected off internal object 825 may be compared to evaluate any variation in flow rate and/or temperature of fluid 840 within volume 875. In some examples, the plurality of signal propagation times may be averaged to determine an average flow rate of fluid 840 through volume 875. In still other examples, one or more of the plurality of signal propagation times may be calibrated or adjusted to compensate for any thermal expansion or retraction of internal object 825 during operation of system 800, and for the associated change in distance of first reflective signal path 812 and/or second reflective signal path 822 as a result of the thermal expansion or retraction.

In some examples, one or both of first transmitter 810 and second transmitter 820 may be configured to both transmit and receive a signal. Similarly, one or both of first emitter 815 and second emitter 825 may be configured to both transmit and receive a signal. A first propagation time associated with a signal transmitted from first transmitter 810 to first emitter 815 may be analyzed in relation with, or otherwise compared to, a second propagation time associated with a signal transmitted in the opposite direction from first emitter 815 to first transmitter 810. The comparison between first and second propagations times may be used to verify, corroborate, and/or calibrate one of both of first transmitter 810 and first emitter 815.

Figure 9:
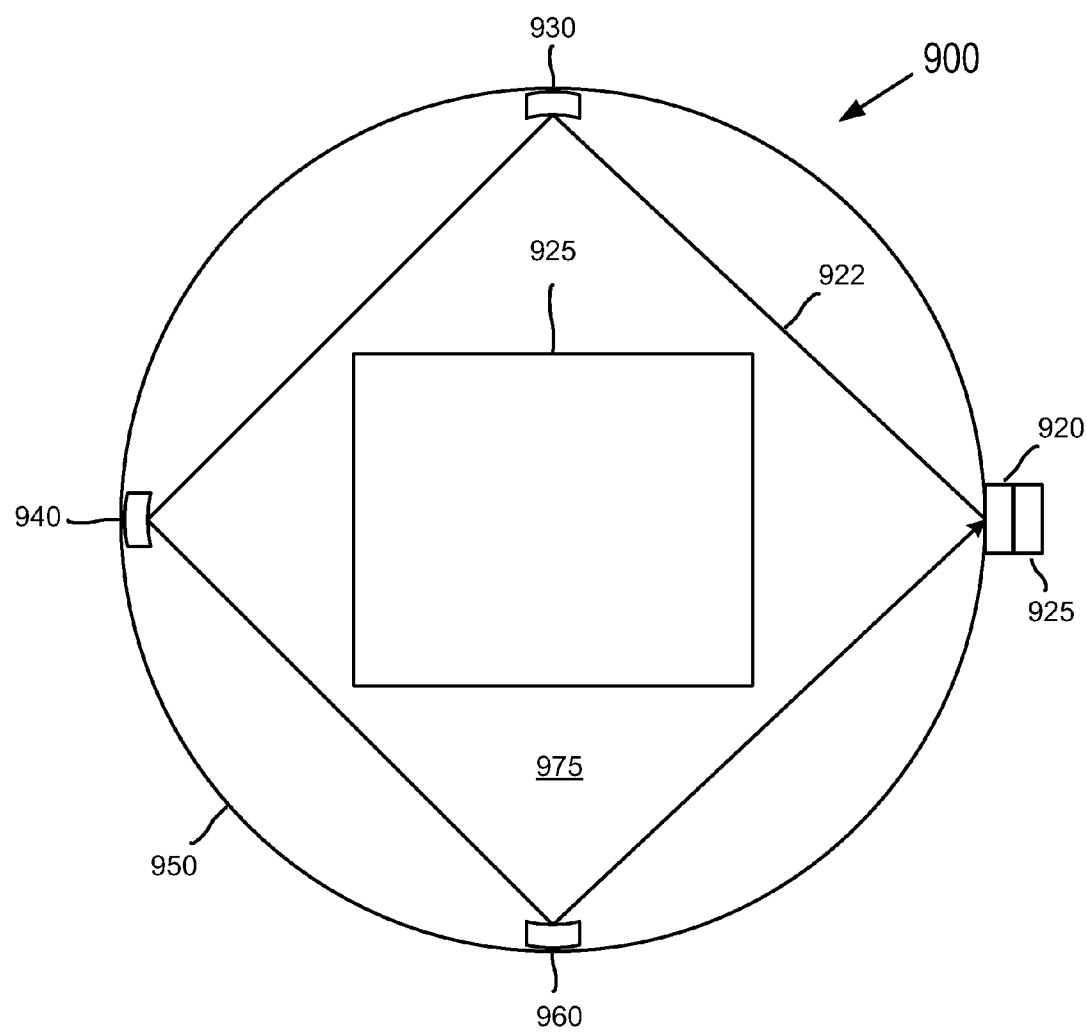
FIG. 9 illustrates a top view of yet another example system for measuring flow rate through a volume.

FIG. 9 illustrates a top view of yet another example system 900 for measuring flow rate through a volume 975. Volume 975 may be located between a fluid container 950 and an internal object 925. In some examples, volume 975 may comprise a concentric or annular shaped region between fluid container 950 and internal object 925, such as when internal object 925 and/or fluid container 950 are cylindrical in shape. In other examples, volume 975 may comprise non-concentric or non-circular annular region, such as when internal object 925 and/or fluid container 950 are non-cylindrical in shape.

A transponder 920 may be configured to transmit a signal along a signal path 922 associated with two or more devices such as propagation devices 930, 940, 960, positioned about a perimeter of fluid container 950. One or more of the propagation devices may comprise a reflective surface. For example, a first propagation device 930 may comprise a reflective surface configured to reflect the signal received from transponder 920 such that the signal is propagated and/or reflected to a second propagation device 940. Similarly, second propagation device 940 may be configured to propagate and/or reflect the signal to a third propagation device 960. Ultimately, the signal path may terminate at a receiving device 925.

Receiving device 925 and/or a processing device communicatively coupled to receiving device 925 may be configured to determine a time of flight of the signal along signal path 922. In some examples, receiving device 925 may be located at a different elevation than transponder 920 on fluid container 950. Similarly, some or all of propagation devices 930, 940, 960 may be located at different or unique elevations. In some examples, one or more of the propagation devices 930, 940, 960 may be mounted or otherwise located internal to fluid container 950. In other examples, one or more of the propagation devices 930, 940, 960 may be mounted or otherwise located external to fluid container 950.

Some or all of the various devices of system 900 may be located internal or external to fluid container 950 without requiring any physical penetrations through the wall of fluid container 950. Rather, at least a portion of signal path 922 may pass through the wall of fluid container 950 at one or more points.

Figure 10:
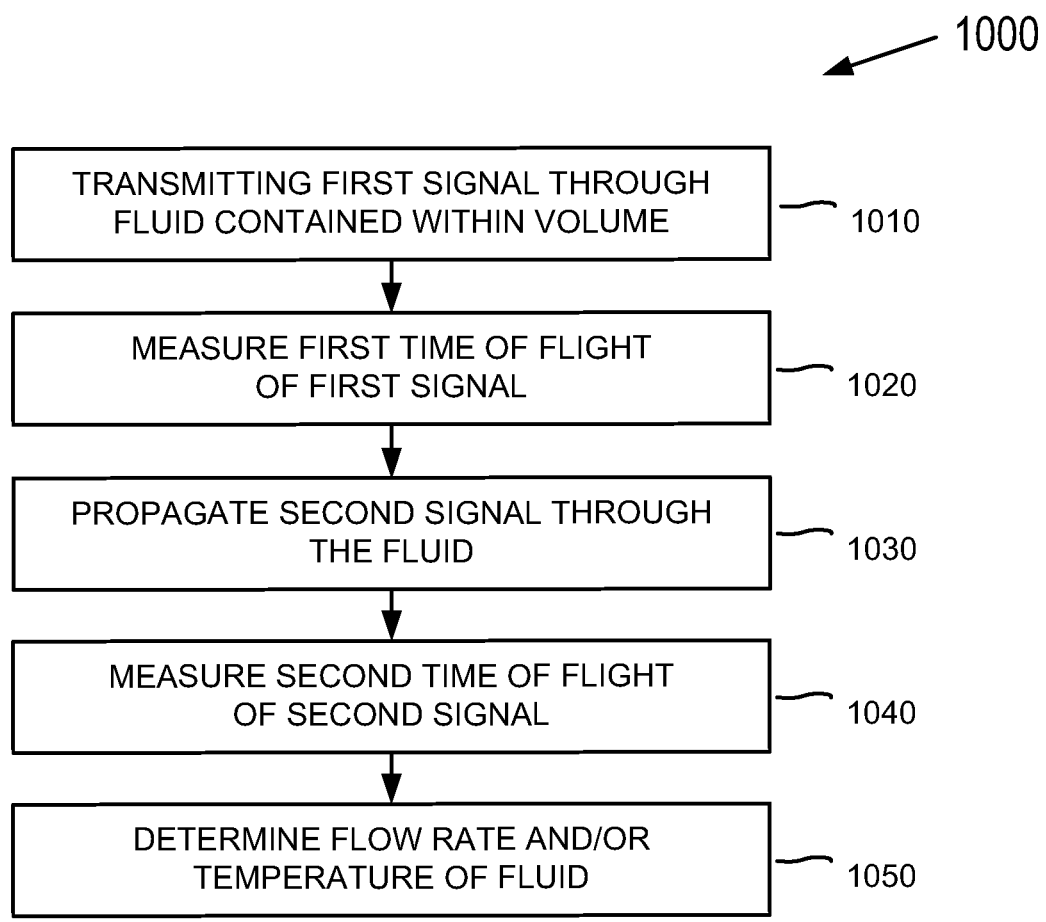
FIG. 10 illustrates a further process of measuring flow rate in a volume.

FIG. 10 illustrates an example process 1000 of measuring flow rate in a volume. At operation 1010, a first signal is transmitted through fluid contained within the volume. The volume may be bounded, at least in part, by an interior surface of an outer structure and an object at least partially located within the outer structure. The transmission device may be located at a first location on the outer structure. In some examples, the first signal may travel through the fluid along a substantially linear path that passes between the object and the interior surface of the outer structure before arriving at the second location.

The object may comprise a cylindrically shaped surface. Additionally, the volume may comprise an annular region formed between the cylindrically shaped surface of the object and the interior surface of the outer structure. In other examples, the object may be non-cylindrical in shape, such as having a cross-section which is substantially rectangular, oval, or otherwise non-circular in cross-section. Accordingly, the volume may comprise a non-circular or non-concentric annular region.

At operation 1020, a first time of flight of the first signal may be measured from the first location to a second location on the outer structure.

At operation 1030, a second signal is propagated through the fluid from the second location to a third location on the outer structure. In some examples, the second signal may travel through the fluid along a substantially linear path that passes between the object and the interior surface of the outer structure before arriving at the third location.

At operation 1040, a second time of flight of the second signal may be measured.

At operation 1050, the flow rate of the fluid within the volume may be determined based, at least in part, on both the first time of flight and the second time of flight. In other examples, a temperature of the fluid may be determined based, at least in part, on the first time of flight and the second time of flight. Determining the flow rate and/or temperature of the fluid within the volume may comprise taking an average of the first time of flight and the second time of flight. In other examples, determining the flow rate and/or temperature of the fluid within the volume may comprise taking a weighted average of the first time of flight and the second time of flight to account for structural interference to the flow of the fluid within the volume.

One or more additional signals may be transmitted through the fluid by one or more additional transponder devices, along substantially linear paths. A plurality of the linear paths may be aggregated as a combined signal path that passes around the internal object. In some examples, the combined signal path may pass completely around the internal object.

The first time of flight of the first signal may be compared with the second time of flight of the second signal to identify irregularities in flow rate and/or temperature of the fluid within the volume. For example, a cold slug of the fluid within the volume may be identified based, at least in part, the comparison of the first time of flight with the second time of flight. Additionally, a location associated with the cold slug may be determined according to which transponder is associated with the signal that identifies the change in temperature and/or the change in flow rate of the fluid.

One or more or all of the systems described herein may be used to measure not only fluid flow rates at one or more locations within the volume, but also any temperature changes or variously at the one or more locations within the volume. By locating the one or more described receivers, emitters, propagation devices, transponders, or other devices at various positions and/or locations with respect to the volume being monitored, fluid characteristics (such as flow rate and temperature) may be mapped or tracked by various of the systems in localized regions or throughout substantially the entire volume.

Although the examples provided herein have primarily described a pressurized water reactor and/or a light water reactor, it should be apparent to one skilled in the art that the examples may be applied to other types of power systems. For example, the examples or variations thereof may also be made operable with a boiling water reactor, sodium liquid metal reactor, gas cooled reactor, pebble-bed reactor, and/or other types of reactor designs. Although certain examples have described the use of acoustic signals to measure, calculate, estimate, or otherwise determine a fluid flow rate, other types of signals are also contemplated herein. Similarly, although some of the examples describe locating the emitters and/or receivers on an external surface of a container, other locations for locating the emitters and/or receivers, such as on an internal surface of the container, are also contemplated herein.

It should be noted that examples are not limited to any particular type of reactor cooling mechanism, nor to any particular type of fuel employed to produce heat within or associated with a nuclear reaction. Any rates and values described herein are provided by way of example only. Other rates and values may be determined through experimentation such as by construction of full scale or scaled models of a nuclear reactor system.

Having described and illustrated various examples herein, it should be apparent that other examples may be modified in arrangement and detail. We claim all modifications and variations coming within the spirit and scope of the following claims.

The invention claimed is:

1. A method for measuring flow rate within a volume comprising:
   transmitting, by a transmission device, a first signal through fluid contained within the volume, wherein the volume is bounded, at least in part, by an interior surface of an outer structure and an object at least partially located within the outer structure, wherein the transmission device is located at a first location on the outer structure;
   measuring a first time of flight of the first signal from the first location to a second location on the outer structure;
   propagating a second signal through the fluid from the second location to a third location on the outer structure;
   measuring a second time of flight of the second signal; and
   determining the flow rate of the fluid within the volume based, at least in part, on both the first time of flight and the second time of flight.

2. The method of claim 1, wherein the first signal travels through the fluid along a substantially linear path that passes between the object and the interior surface of the outer structure before arriving at the second location.

3. The method of claim 2, wherein the second signal travels through the fluid along a substantially linear path that passes between the object and the interior surface of the outer structure before arriving at the third location, and wherein the method further comprises:
   transmitting one or more additional signals through the fluid along a substantially linear path; and
   aggregating a plurality of the linear paths as a combined signal path that passes around the object.

4. The method of claim 3, wherein the combined signal path passes completely around the object.

5. The method of claim 2, wherein the object comprises a cylindrically shaped surface, and wherein the volume comprises an annular region formed between the cylindrically shaped surface of the object and the interior surface of the outer structure.

6. The method of claim 1, wherein determining the flow rate of the fluid within the volume comprises taking an average of the first time of flight and the second time of flight.

7. The method of claim 1, wherein determining the flow rate of the fluid within the volume comprises taking a weighted average of the first time of flight and the second time of flight to account for structural interference to the flow of the fluid within the volume.

8. The method of claim 1, further comprising comparing the first time of flight with the second time of flight to identify irregularities in flow rate of the fluid through the volume.

9. The method of claim 8, further comprising identifying a cold slug of the fluid within the volume based, at least in part, the comparison of the first time of flight with the second time of flight.

10. The method of claim 1, further comprising determining a temperature of the fluid based, at least in part, on an average of the first time of flight and the second time of flight.

11. An apparatus for measuring flow rate within a volume, comprising:
    means for transmitting a first signal through fluid contained within the volume, wherein the volume is bounded, at least in part, by an interior surface of an outer structure and by an object at least partially located with the outer structure, wherein the means for transmitting is located at a first location on the outer structure;
    means for measuring a first time of flight of the first signal from the first location to a second location on the outer structure;
    means for propagating a second signal through the fluid from the second location to a third location on the outer structure, wherein a second time of flight is measured for the second signal; and
    means for determining the flow rate of the fluid within the volume based, at least in part, on both the first time of flight and the second time of flight.

12. The apparatus of claim 11, wherein the means for propagating is located at the second location on the outer structure.

13. The apparatus of claim 12, wherein the means for propagating comprises a means for transmitting the second signal through the fluid.

14. The apparatus of claim 13, wherein the means for propagating further comprises means for receiving the first signal, and wherein the means for transmitting the second signal and the means for receiving the first signal are co-located at the second location on the outer structure.

15. The apparatus of claim 14, wherein the second signal is transmitted to the third location in response to the first signal being received by the means for receiving.

16. The apparatus of claim 12, wherein the means for propagating comprises means for reflecting the first signal to propagate the second signal.

17. The apparatus of claim 11, wherein the outer structure is associated with an overall length through which the fluid flows, and wherein the first location, the second location, and the third location are associated with different longitudinal positions along the overall length of the outer structure, and wherein both the first signal and the second signal travel along a signal path formed at a non-perpendicular angle with respect to the flow of the fluid through the volume.

18. The apparatus of claim 11, wherein the first signal and the second signal travel along at least a portion of a signal path formed between the first location and the third location, and wherein the means for transmitting and the means for propagating are positioned on the outer structure so that the signal path avoids the object.

19. A system for measuring flow rate within a volume, comprising:
    a first transmission device configured to transmit a first signal through fluid contained within the volume, wherein the volume is bounded, at least in part, by an interior surface of an outer structure and by an object at least partially contained within the outer structure, and wherein the first transmission device is located at a first location on an exterior surface of the outer structure so as to transmit the first signal while avoiding the object;
    a processing device configured to measure a first time of flight of the first signal from the first location to a second location on the exterior surface of the outer structure; and
    a second transmission device located at the second location and configured to transmit a second signal through the fluid from the second location to a third location on the exterior surface of the outer structure while avoiding the object, wherein the processing device is further configured to measure a second time of flight for the second signal, and wherein the flow rate of the fluid within the volume is determined based, at least in part, on both the first time of flight and the second time of flight.

20. The system of claim 19, further comprising a receiving device co-located with the second transmission device at the second location, wherein the first transmission device and the receiving device are associated with different longitudinal positions along the overall length of the outer structure, and wherein the second transmission device is configured to transmit the second signal in response to the receiving device having received the first signal.

* * * * *

UNITED STATES PATENT AND TRADEMARK OFFICE
CERTIFICATE OF CORRECTION

| | |
|---|---|
| PATENT NO. | : 9,945,704 B2 |
| APPLICATION NO. | : 14/791233 |
| DATED | : April 17, 2018 |
| INVENTOR(S) | : Cristhian Galvez |

It is certified that error appears in the above-identified patent and that said Letters Patent is hereby corrected as shown below:

In the Specification

In Column 1, Line 10, delete "GOVERNMENT INTEREST".

In Column 1, Lines 12-14, delete "This invention was made with Government support under Contract No. DE-NE0000633 awarded by the Department of Energy. The Government has certain rights in this invention."

Signed and Sealed this
Eighteenth Day of April, 2023

Katherine Kelly Vidal
*Director of the United States Patent and Trademark Office*